United States Patent
Tucker

[11] Patent Number: 5,873,710
[45] Date of Patent: Feb. 23, 1999

[54] MOTOR SPACER FOR HERMETIC MOTOR-COMPRESSOR

[75] Inventor: Richard S. Tucker, Quincy, Ohio

[73] Assignee: Copeland Corporation, Sidney, Ohio

[21] Appl. No.: 789,946

[22] Filed: Jan. 27, 1997

[51] Int. Cl.⁶ .................................. F04B 35/04; F01C 1/02
[52] U.S. Cl. ...................... 417/410.5; 417/902; 418/55.1; 310/89
[58] Field of Search ............................. 417/423.7, 424.1, 417/410.5, 902; 418/55.1; 310/51, 89, 91, 259

[56] References Cited

U.S. PATENT DOCUMENTS

| | | |
|---|---|---|
| 1,688,891 | 10/1928 | Spreen . |
| 2,179,268 | 11/1939 | Neeson . |
| 2,225,228 | 12/1940 | Neeson . |
| 2,413,653 | 12/1946 | Rataiczak . |
| 2,473,904 | 6/1949 | Rataiczak . |
| 2,508,253 | 5/1950 | Haggardt . |
| 2,632,861 | 3/1953 | Morton et al. . |
| 2,885,580 | 5/1959 | Scanlon et al. . |
| 3,790,309 | 2/1974 | Volz . |
| 3,978,357 | 8/1976 | Voelbel et al. . |
| 4,134,036 | 1/1979 | Curtiss . |
| 4,318,218 | 3/1982 | Nelson . |
| 4,350,479 | 9/1982 | Tojo et al. . |
| 4,365,941 | 12/1982 | Tojo et al. ............................ 417/410.5 |
| 4,415,824 | 11/1983 | Meier . |
| 4,536,671 | 8/1985 | Miller . |
| 4,587,722 | 5/1986 | Miller . |
| 4,592,703 | 6/1986 | Inaba et al. . |
| 4,760,299 | 7/1988 | Dickie et al. . |
| 4,778,354 | 10/1988 | Idei . |
| 4,781,550 | 11/1988 | Morishita et al. . |
| 4,837,468 | 6/1989 | Froment . |
| 4,846,639 | 7/1989 | Morishita et al. . |
| 4,894,574 | 1/1990 | Ragaly . |
| 4,908,347 | 3/1990 | Denk . |
| 5,079,466 | 1/1992 | Jones . |
| 5,134,327 | 7/1992 | Sumi et al. . |
| 5,196,749 | 3/1993 | Palma et al. . |
| 5,227,686 | 7/1993 | Ogawa . |
| 5,323,075 | 6/1994 | Denk et al. . |
| 5,334,897 | 8/1994 | Ineson et al. . |
| 5,354,182 | 10/1994 | Niemiec et al. . |
| 5,382,859 | 1/1995 | Huang et al. . |
| 5,401,146 | 3/1995 | Moriya et al. . |
| 5,403,163 | 4/1995 | Murphy . |

*Primary Examiner*—Charles G. Freay
*Attorney, Agent, or Firm*—Harness, Dickey & Pierce, P.L.C.

[57] ABSTRACT

A motor spacer is disclosed which is well suited for use in securely fitting a motor stator of a first diameter within a housing of a greater diameter which thus avoids the need to provide more costly stepped type housings to accommodate both motor and driven apparatus. The motor spacer is particularly well suited for use in connection with hermetic motor compressors in those applications in which it is desired to utilize a shell diameter greater than that of the motor stator yet still support the motor by the outer shell. Because the motor spacer is somewhat flexible, it facilitates simultaneous assembly of the motor stator to the spacer and the spacer within the outer shell while also accommodating a wider range of tolerances between these components.

19 Claims, 2 Drawing Sheets

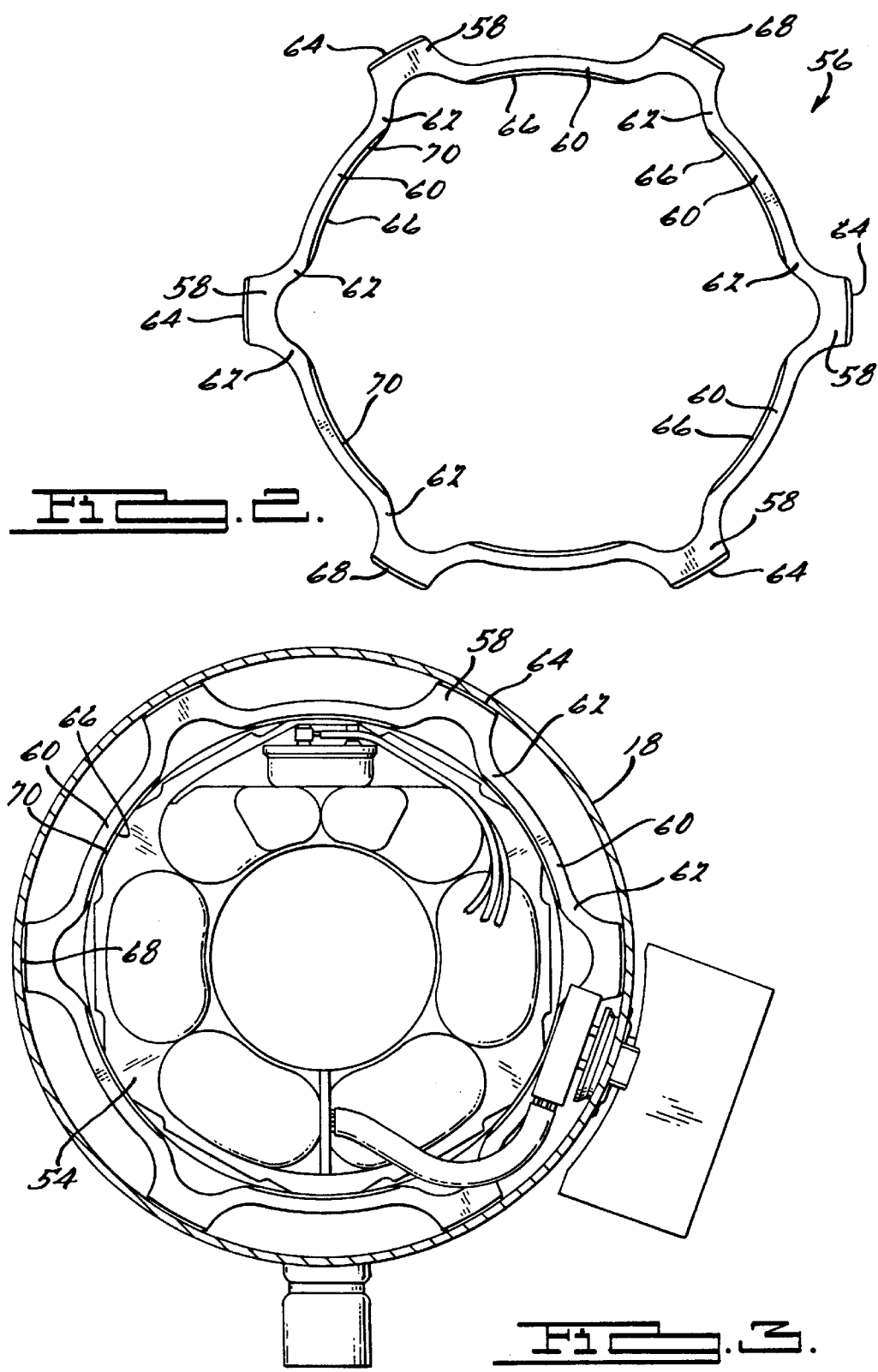

MOTOR SPACER FOR HERMETIC MOTOR-COMPRESSOR

BACKGROUND AND SUMMARY OF THE INVENTION

The present invention relates generally to an apparatus incorporating driving motors disposed in a common housing and more specifically to hermetic motor compressor assemblies.

Many types of machines incorporate a driving motor disposed in a housing which housing also encloses the apparatus being driven by the motor. Hermetic motor compressors are typical of such machines. In the case of most reciprocating compressor designs, the motor stator is usually mounted directly to the cylinder block, as is desirable with the conventional internal spring mounting arrangement of the cylinder block used in such compressors. In the case of scroll (or rotary) compressor designs, where spring-mounting of the compression members is not required, a simplified and more economical method can be employed. For these cases, the motor is usually mounted by press fit directly into the compressor shell, thereby requiring the size of the motor stator laminations outer diameter to coincide with the size of the compressor shell.

In the design of scroll compressors for particular applications, it may be desirable to allow the size of the compressor shell to depart from the frame size of the motor stator, allowing geometrical optimization of both members to occur independent of the other. In the case where the desired compressor shell size is larger than the size of the desired motor stator frame, the need arises to arrive at a convenient method of mounting the motor stator, so as to avoid the economical disadvantages of added cast iron housings, mounting fasteners, and the like. While it is possible to provide a shell having a first portion of one diameter to accommodate the compressor and another portion of a different diameter to accommodate the motor stator, such stepped type shells are more costly to fabricate than conventional cylindrical shells.

In applications in which the motor stator diameter is less than the compressor diameter it is possible to incorporate an intermediate sleeve member having an inside diameter that adapted to receive the motor stator in a press fit relationship and an outside diameter adapted to receive the compressor outer shell in a press fit relationship. In the case where the difference in size between the motor stator and the compressor shell is large, the primary problem faced with this approach is damage (buckling) to the motor stator laminations, due to the extreme stiffness created by the thickness of the sleeve. In such cases, all the stress present from the press fit is affected primarily normal to the stator lamination outside diameter. This problem is greatly magnified if a cold press-fit technique (most economical) is employed, as the stress of the press fit between the parts must be initially supported solely by the first (several) lamination(s) in the stack, during the initial entry of the press fit.

The present invention overcomes these problems by providing a flexible sleeve which flexes when subjected to the forces from the press fit of the motor stator and the compressor shell, while transmitting enough normal force to "grip" between the compressor shell and the motor stator, thereby effectively supporting the motor and the torque generated thereby. The more flexible the sleeve can be designed, the less strict control of size is permitted in the manufacture of the stator laminations and the compressor shell.

In a preferred embodiment, the sleeve is in the form of an irregular or multilobed cylinder in which a plurality of radially inner surfaces are provided which engage the stator and a plurality of radially outer surfaces engage the outer shell and are circumferentially offset from the radially inner surfaces. By selection of the size, material and wall thickness, the retaining forces exerted on both the stator and shell can be controlled to ensure adequate holding power while still enabling efficient press fit assembly of the components.

Additional advantages and features of the present invention will become apparent from the subsequent description and the appended claims taken in conjunction with the accompanying drawings.

BRIEF DESCRIPTION OF THE DRAWINGS

FIG. 2 is a plane view of the motor spacer ring shown in FIG. 1; and

FIG. 3 is a section view of the compressor shown in FIG. 1, the section being taken along line 3—3 thereof.

DESCRIPTION OF THE PREFERRED EMBODIMENT

Figure 1:
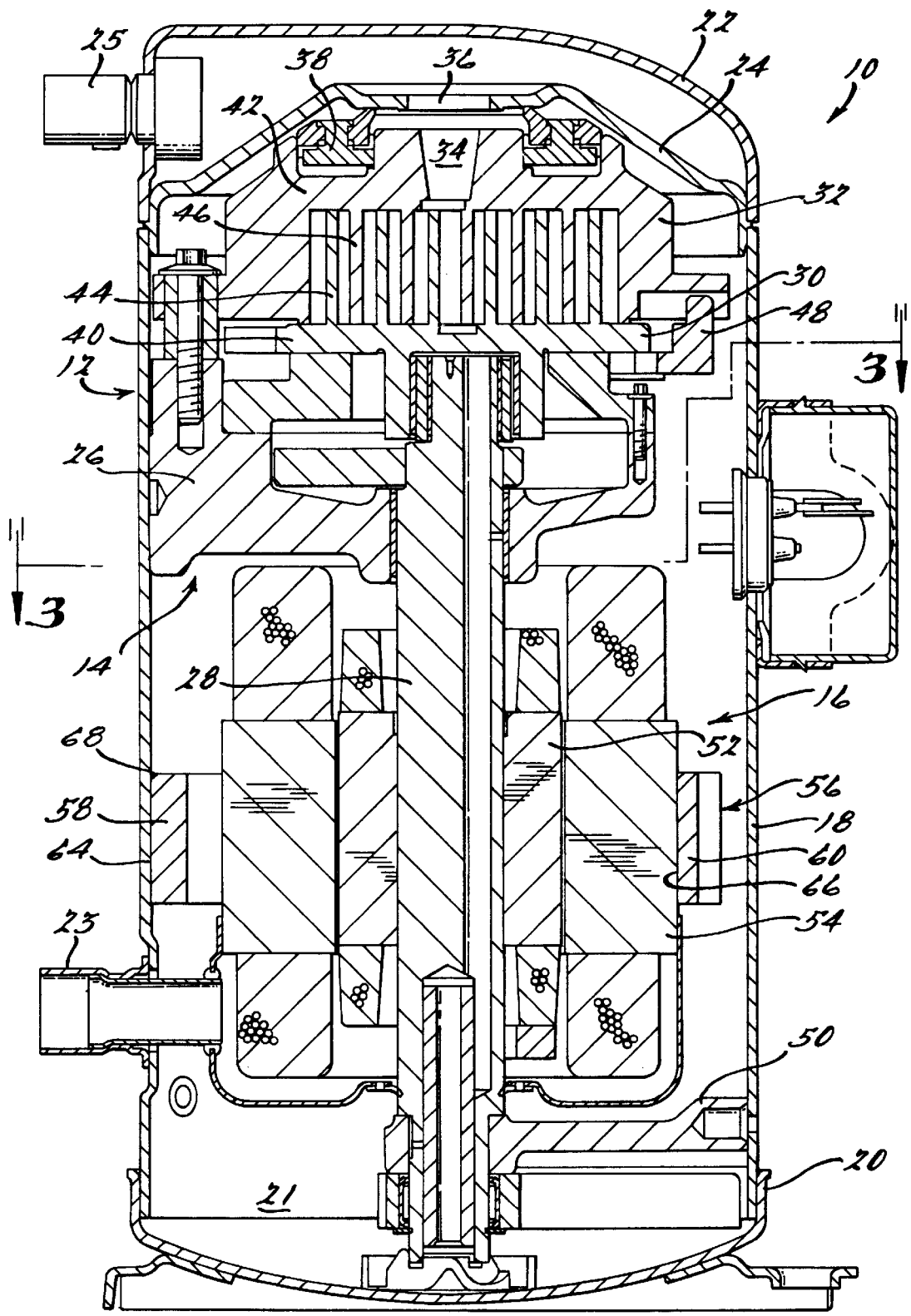
FIG. 1 is a cross sectional view of a scroll-type refrigeration compressor incorporating a motor stator supported within an outer shell in accordance with the present invention.

Referring now to the drawings and in particular to FIG. 1, there is shown a hermetic refrigeration compressor of the scroll-type indicated generally at 10. Compressor 10 includes an outer shell 12 within which is disposed a compressor assembly indicated generally at 14 and a drive motor 16.

Outer shell 12 includes a generally circular cylindrical center member 18, a bottom cover member 20 secured to the lower end thereof and a top cover member 22 secured to the upper end of center member 18. The lower portion of shell 12 also defines a sump 21 for lubricant. A muffler plate 24 is also provided being secured about its periphery to both top cover member 22 and center member 18 and serves to define a discharge chamber in the upper end portion of shell 12 adapted to receive compressed refrigerant discharged from compressor assembly 14. A suction inlet fitting 23 is provided in center member 18 and a discharge outlet fitting 25 is provided in top cover member 22.

Compressor assembly 14 includes a main bearing housing 26 which is supportingly secured to center potion 18 of outer shell and rotatably supports a drive shaft 28. An orbiting scroll member 30 is drivingly coupled to an eccentric pin portion of crankshaft 28 and is axially supported for orbital movement on bearing housing 26. A non-orbiting scroll member 32 is axially movably secured to main bearing housing 26 and includes a centrally located discharge port 34 axially aligned with a discharge inlet opening 36 provided in muffler plate 24. A floating seal 38 is positioned in surrounding relationship to discharge port 34 and defines a sealed fluid passage between discharge port 34 and discharge inlet opening 36.

Scroll members 30 and 32 each include an end plate 40 and 42 respectively from which spiral wraps 44, 46 respectively project. As shown, spiral wraps 44 and 46 are positioned in interleaved relationship with their respective tips being in sealing engagement with the end plate of the opposed scroll member. As orbiting scroll member 30 undergoes orbital movement with respect to non-orbiting scroll member 32, wraps 44 and 46 will define moving fluid pockets which decrease in size as they travel from a radially outer position to a radially inner position.

In order to prevent rotational movement of orbiting scroll member 30, an Oldham coupling 48 is provided being supported on main bearing housing 26 and including pairs of abutments engaging abutments provided on orbiting scroll member 30 and non-orbiting scroll member 32.

A lower bearing assembly 50 is also provided which is secured to center member 18 adjacent the lower end thereof and serves to rotatably support the lower end of drive shaft 28. The lower end of drive shaft 28 extends into lubricant sump 21 and includes a suitable pump and internal passages for directing oil from the sump to lubricate the bearings and other moving components of compressor 10.

Driving motor 16 is disposed below compressor assembly 14 and includes a rotor 52 secured to drive shaft 18 intermediate the ends thereof and a stator 54 positioned in surrounding relationship to rotor 52.

In operation, suction gas is drawn into outer shell 12 through suction inlet fitting 23 and thence into pockets being formed between wraps 44 and 46 through inlet openings at the outer periphery of scroll members 30 and 32. As orbiting scroll member 30 orbits with respect to scroll member 32, the thus formed fluid pockets will travel radially inwardly being progressively reduced in size and thus compressing the suction gas. The compressed refrigerant will ultimately be discharged through discharge port 34 into the discharge chamber from which it flows to the refrigeration or air condition system via discharge outlet 25.

Compressor 10, as thus far described, is disclosed in greater detail in U.S. Pat. Nos. 4,767,293; 5,156,539; 5,411,384; and 5,320,506, all of which are owned by the assignee of the present invention and the disclosures of which are hereby incorporated by reference.

As mentioned above, in many cases it is desirable to utilize a motor in which the stator has an outside diameter less than that of the compressor assembly and/or outer shell. In order to enable such motors to be utilized in such compressors without the added expense of providing a reduced diameter shell to accommodate the motor stator or some other fastening arrangement, the present invention provides a motor spacer ring 56 which is designed to be press fitted onto the outer periphery of the motor stator 54 and the assembly to then be press fitted into the center member 18 of outer shell 12.

As best seen with reference to FIGS. 2 and 3, motor spacer ring 56 is generally circular in shape having a plurality of circumferentially spaced radially outwardly projecting portions 58 provided around the circumference thereof. A plurality of radially inwardly spaced portions 60 are interposed between projections 58 and include radially outwardly extending arcuate portions 62 at opposite ends thereof which serve to interconnect portions 58 and 60.

Portions 58 each include a radially outwardly facing surface 64 all of which surfaces lie along the circumference of an imaginary circle, the diameter of which is sized relative to the inside diameter of center portion 18 of shell 12 to enable motor spacer 56 to be press fitted therein. Similarly, each of radially inwardly spaced portions 60 includes a radially inwardly facing surface 66 all of which surfaces lie along the circumference of a second imaginary circle, the diameter of which is selected relative to the diameter of the motor stator 54 so as to enable the motor spacer 56 to be press fitted onto the motor stator 54. Preferably, slight chamfers 68 and 70 will be provided at the axial ends of surfaces 64 and 66 respectively so as to facilitate a press fit assembly of motor spacer 56 to outer shell 12 and motor stator 54.

As best seen with reference to FIG. 3, when motor spacer 56 is assembled to stator 54 and center portion 18 of outer shell 12, surfaces 64 will be in tight press fitted engaging relationship with the inner peripheral surface of outer shell 12 and surfaces 66 will be in tight press fitted engaging relationship with the outer periphery of stator 54. As shown, the radially inner surface of outwardly projecting portions 58 is spaced away from the outer surface of stator 54 thus preventing the forces resulting from the press fit relationship between outer shell 12 and motor spacer 56 being directly transferred to motor stator 54. Similarly, the radially outwardly facing surfaces of portions 60 are spaced away form shell 12 thus preventing the forces resulting from the press fit relationship between motor stator 54 and motor spacer 56 form being directly transmitted to the outer shell 12. These respective spaces together with the arcuate portions 62 thus enable some flexing of the motor spacer ring whereby the press fitting forces may be accommodated without risk of potential damage to the motor stator laminations. This flexibility is particularly important during the assembly process as the press fitting forces are initially exerted on only the first few of the stator laminations as the stator is being press fitted into the spacer and the spacer is being press fitted into the shell. Should these forces become excessive, these initial laminations could become damaged thereby potentially impairing operation of the motor.

It should be noted that while motor spacer 56 has been shown as incorporating six of each of surfaces 64 and 66, the number as well as the relative size (in both axial and circumferential directions) thereof may be varied for a particular application so as to provide a sufficient surface area of engagement to ensure a secure fixed supporting relationship is created between the outer shell 12 and motor stator 54. Additionally, the "gripping force" may also be controlled by properly selecting the flexibility of arcuate portions 62. Preferably, these various factors will be controlled so as to enable motor stator 54 to be press fitted to motor spacer 56 simultaneously with the press fitting of motor spacer 56 into center member 18 of shell 12. It should also be noted that because of the flexibility of motor spacer 56, greater tolerances may be accommodated in both the motor stator and shell construction thus offering an additional economical advantage. In a preferred version, the wall thickness of motor spacer will be substantially constant which facilitates manufacturing thereof such as by powdered metal technology. It is possible by such procedures to fabricate motor spacer 56 in its final form without requiring any secondary finishing or machining operations thus keeping the costs of spacer 56 at a reduced level.

As may now be appreciated, the present invention provides a relatively inexpensive means by which motor stators of small diameters may be easily and conveniently utilized in motor compressor or other apparatus in which the motor and driven apparatus are press fitted within a common housing. It should be noted that while motor spacer 56 has been shown in conjunction with a scroll compressor, it is well suited for use in many other applications including for example other types of rotary compressors.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. A motor spacer for use in mounting of a motor stator of a first outside diameter within a housing of a diameter greater than said first diameter, said motor spacer comprising a continuous annular member having a plurality of radially outwardly facing circumferentially spaced first surface portions adapted to engage an inner surface of said housing and a plurality of radially inwardly facing circumferentially spaced second surface portions adapted to engage an outer surface of said motor stator, said first surface portions being circumferentially shifted from said second surface portions so as to avoid alignment thereof in a radial direction.

2. A motor spacer as set forth in claim 1 wherein said motor spacer includes a plurality of third surface portions facing radially inwardly and spaced from said outer surface portion of said motor stator.

3. A motor spacer as set forth in claim 2 wherein said third surface portions are interposed between adjacent second surface portions.

4. A motor spacer as set forth in claim 3 wherein said third surface portions are radially aligned with said first surface portions.

5. A motor spacer as set forth in claim 1 wherein said plurality of first surface portions lie along the circumference of an imaginary circle, said circle having a diameter relative to the diameter of said housing to enable said motor spacer to be press fitted therein.

6. A motor spacer as set forth in claim 1 further comprising arcuate portions extending between respective ones of said first and second surface portions.

7. A motor spacer as set forth in claim 6 wherein said arcuate portions provide a flexibility to said motor spacer whereby said motor spacer may accommodate housings of varying diameters and stators of varying diameters.

8. A motor spacer as set forth in claim 1 wherein said motor spacer has an axial length less than the axial length of said stator.

9. A motor spacer as set forth in claim 1 wherein said motor spacer has a substantially constant wall thickness around its circumference.

10. A motor spacer as set forth in claim 1 wherein said first surfaces are sized relative to said housing to provide a first predetermined gripping force, said second surface portions are sized relative to said stator to provide a second predetermined gripping force, said first and second predetermined gripping forces being sufficient to resist relative movement between said stator and said housing.

11. A motor spacer as set forth in claim 1 wherein said first surface portions lie along the circumference of an imaginary circle of a second predetermined diameter and said second surface portions lie along the circumference of an imaginary circle of a third predetermined diameter, the difference between said second and third predetermined diameters being greater than the difference between said first outside diameter and said housing diameter.

12. A motor spacer as set forth in claim 11 further comprising interconnecting portions extending between said first and second surface portions, said interconnecting portions imparting a slight flexibility to said motor spacer whereby said second predetermined diameter may be decreased as said motor spacer is assembled to said housing.

13. A motor spacer as set forth in claim 12 wherein said interconnecting portions enable said third predetermined diameter to be increased as said motor spacer is assembled to said stator.

14. A refrigeration compressor comprising:

an outer shell including a generally cylindrical portion of a first diameter;

a compressor mechanism supported within said shell;

a motor disposed within said shell and drivingly connected to said compressor, said motor including a stator of a second diameter, said second diameter being less than said first diameter; and a motor spacer for mounting said stator within said generally cylindrical portion, said motor spacer including a plurality of first radially outwardly facing surface portions engaging an inner surface of said shell, a plurality of second radially inwardly facing surface portions engaging said stator, said first and second surface portions cooperating to provide the sole support of said stator within said cylindrical portion of said shell.

15. A refrigeration compressor as set forth in claim 14 wherein said first surface portions are shifted circumferentially from said second surface portions so as to avoid radial alignment thereof.

16. A refrigeration compressor as set forth in claim 14 further comprising interconnecting portions extending between selected ones of said first and second surface portions, said interconnecting portions operating to allow slight relative radial movement between said first and second surfaces as said motor spacer, said stator and said cylindrical portion are assembled.

17. A refrigeration compressor as set forth in claim 14 wherein said compressor is a scroll compressor.

18. A refrigeration compressor as set forth in claim 16 wherein said motor spacer is in the form of an annular ring, said first and second surfaces being positioned in alternating circumferentially spaced relationship with said interconnecting portions being positioned between circumferentially adjacent first and second surfaces.

19. A refrigeration compressor as set forth in claim 14 wherein said first surface portions lie along the circumference of an imaginary circle of a third diameter, said second surface portions lie along the circumference of an imaginary circle of a fourth diameter, the size of said first and second surface portions, the relative size between said first and third diameters and the relative size between said second and fourth diameters being selected so as to provide a sufficient gripping force to resist relative movement between said motor stator and said outer shell.

* * * * *